(12) United States Patent
Sharma et al.

(10) Patent No.: US 11,900,830 B1
(45) Date of Patent: Feb. 13, 2024

(54) DYNAMIC VIRTUAL ENVIRONMENT FOR IMPROVED SITUATIONAL AWARENESS

(71) Applicant: Amazon Technologies, Inc., Seattle, WA (US)

(72) Inventors: Anthony Sharma, Vallejo, CA (US); Jarrod Sherwin, Kent, WA (US); Leah Autumn Thompkins, Seattle, WA (US); Kaspar Kenneth Mueller, Madison, WI (US); Husam Saqallah, Newcastle, WA (US); Mehran Kafai, San Diego, CA (US); Kelly Anne Nigh, Seattle, WA (US); Muge Erdirik Dogan, Shoreline, WA (US)

(73) Assignee: Amazon Technologies, Inc., Seattle, WA (US)

( * ) Notice: Subject to any disclaimer, the term of this patent is extended or adjusted under 35 U.S.C. 154(b) by 390 days.

(21) Appl. No.: 17/213,699

(22) Filed: Mar. 26, 2021

(51) Int. Cl.
*G09B 5/06* (2006.01)
*G09B 19/00* (2006.01)

(52) U.S. Cl.
CPC .......... *G09B 5/067* (2013.01); *G09B 19/003* (2013.01)

(58) Field of Classification Search
None
See application file for complete search history.

(56) References Cited

U.S. PATENT DOCUMENTS

| | | | | |
|---|---|---|---|---|
| 3,460,270 | A * | 8/1969 | Blitz | G09B 13/02 434/228 |
| 8,538,739 | B2 * | 9/2013 | Woodbury | G09B 9/00 434/28 |
| 2012/0258437 | A1 * | 10/2012 | Sadeh-Koniecpol | G06F 21/56 434/362 |
| 2015/0310748 | A1 * | 10/2015 | Spiegelman | G09B 5/00 434/219 |
| 2015/0310758 | A1 * | 10/2015 | Daddona | G09B 9/02 434/30 |
| 2016/0351064 | A1 * | 12/2016 | Volpa | G09B 5/14 |
| 2017/0039875 | A1 * | 2/2017 | Kubiak | G09B 19/00 |
| 2019/0259292 | A1 * | 8/2019 | Williams | G06F 18/24323 |
| 2021/0020060 | A1 * | 1/2021 | Hirsch | G06F 3/011 |

* cited by examiner

*Primary Examiner* — Jay Trent Liddle
*Assistant Examiner* — Alyssa N Brandley
(74) *Attorney, Agent, or Firm* — Kilpatrick Townsend & Stockton LLP

(57) ABSTRACT

User information may be used to create a training exercise representing simulated package delivery. The user information can include metrics corresponding to physical package delivery. The user information may be used as part of a predictive model to determine the content of the training exercise, including the type and number of tasks comprising the exercise. Once created, the training exercise can be presented to a user as a graphical simulation. The presentation can occur in response to one or more triggering conditions.

20 Claims, 8 Drawing Sheets

DYNAMIC VIRTUAL ENVIRONMENT FOR IMPROVED SITUATIONAL AWARENESS

BACKGROUND

Interactive learning content can be presented to users through many types of electronic devices. For example, a smartphone can be used to present learning or training modules, videos, or information to a user via an application or web browser interface. The user can interact with the material in various ways, including selecting topics for training, choosing responses to events in a learning scenario, or answering questions in a quiz. However, most user learning content is rigid, requiring the user to both navigate sequentially through the material and choose correct responses before proceeding from one part to the next. Moreover, it can be challenging to tailor learning content to a particular user so that the content is both relevant and useful while remaining engaging and fun.

BRIEF DESCRIPTION OF THE DRAWINGS

Various embodiments in accordance with the present disclosure will be described with reference to the drawings, in which.

DETAILED DESCRIPTION

Figure 1:
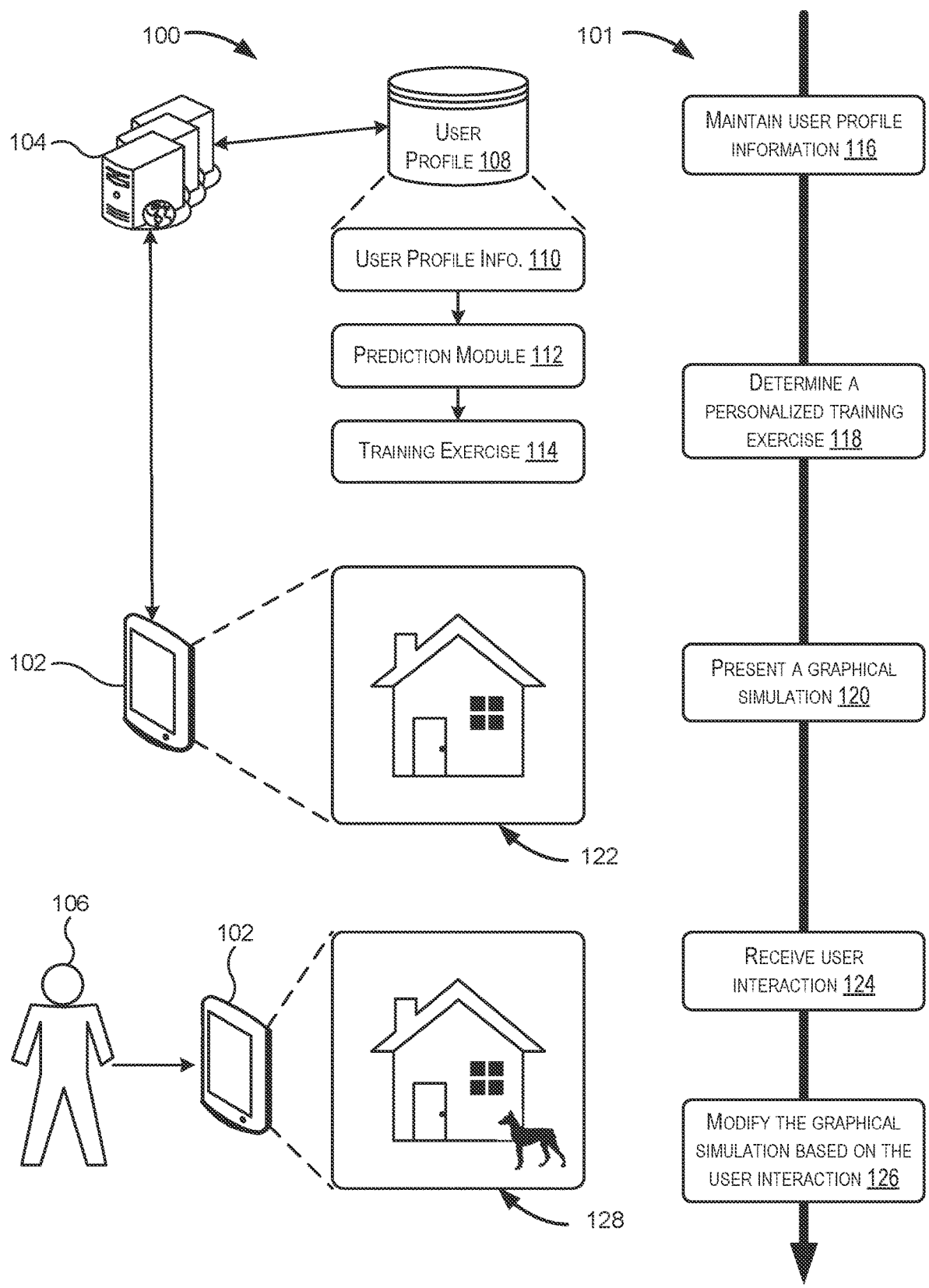
FIG. 1 is a simplified block diagram and associated flow chart of an example process to generate and present a personalized training exercise, according to some embodiments.

Examples and embodiments described herein are directed to, among other things, techniques for creating and presenting learning content, including training exercises. The training exercises can relate to any number of tasks, scenarios, situations, or events for which training or simulated experience may be beneficial. A training exercise can be a graphical simulation of a real-world scenario that a user might encounter in the course of the day, for instance, one of the tasks that constitutes their work duties. The exercise can be presented to the user at a computer or similar device, including a smartphone, allowing the user to engage interactively with the simulation. Unlike existing training methods, the training exercises described herein can allow the user the freedom to explore the full scope of the simulation without requiring success at an earlier step before proceeding to a later step. In several embodiments, the training exercises may be personalized to correspond to the user engaging in the training exercise. For example, the user may be new to a particular task but experienced at other tasks, so that the exercise can focus on the new task without presenting a repetition of material with which the user is familiar.

In some embodiments, the determination of the training exercise can be based on user information that identifies the user and corresponds to one of several experience indicators including, but not limited to, the user's prior experience with a task or scenario present in the training exercise. For example, an employee with a long tenure at their current position may find training corresponding to infrequently encountered tasks to be more beneficial than training corresponding to common tasks; conversely, for a newer employee, training corresponding to common tasks may be the most beneficial. The determination of the training exercise can also be based on a predictive model or other statistical model that takes as one of its inputs the user information and produces as an output a prediction corresponding to one or more training exercises for the user. The prediction can be used to customize the training exercise for the user, including selecting the number and type of tasks comprising the training exercise and selecting graphics representing those tasks within the simulation. Other inputs in the predictive model can include the user's self-selected preferences for training content, feature recommendations associating the user with other users to identify similarities, and a user's past performance with other training exercises or real-word tasks. The predictive model and other statistical models can be, in some embodiments, part of a prediction module or other software module or engine configured to process the model information and arrive at a prediction for a training exercise.

In several embodiments, the training exercises correspond to deliveries, including deliveries of packages to residential and commercial buildings. The deliveries can involve the last portion of the delivery process where the package is taken from a delivery vehicle and delivered to the required delivery location on the premises. As used throughout this disclosure, the term "package" is not limited to a parcel or a box and can include, among other things, envelopes, food containers, bags, or any other item that may be delivered to a premises. For example, a delivery can be to a residential house, where the delivery location can be at the porch. A delivery person may be required to leave the package out of public view (e.g., placing the package behind a hedge) or leave the package with a resident, according to one or more delivery policies. In some instances, the delivery person may need to comply with specific delivery instructions to successfully complete the delivery, including, for example, verifying the age of a recipient prior to leaving the package or calling the recipient on arrival to secure a dog on the premises. As a further example, a delivery can be to an apartment building, where the delivery person may encounter secured access to the building and a common area mailroom. These instances may require that the delivery person check delivery instructions for an access code or for recipient requests for leaving the package in a common area (e.g., place the package in view of a security camera).

As can be seen by these examples, a delivery can include numerous tasks that can vary significantly from one delivery to another. The corresponding training exercises in the embodiments described herein can likewise include several training tasks corresponding to a real-world delivery counterpart. The customization of a training exercise can include selecting and arranging training tasks in a modular way. For instance, the training exercise can include delivering (virtually) a package to a house with a dog, requiring the user to complete training tasks corresponding to handling a dog encounter, including checking special delivery instructions and calling the recipient. The same training exercise may also include training tasks corresponding to verifying the recipient's age. A subsequent training exercise for the user may include the dog encounter and omit the age verification instruction, but may require the user to handle the dog encounter differently (e.g., contact delivery support personnel). Moreover, a training exercise can be modified while the user interacts with it. In some embodiments, the modification can be based upon a choice or other interaction the user makes with an early training task in the exercise (e.g., checking for delivery instructions immediately). In other embodiments, the modification can be based upon a certain probability of a simulated event occurring (e.g., a 20% chance that the training exercise will have a dog encounter). In these embodiments, a user interaction may modify the probability of a subsequent task occurring.

In addition to customizing the type of training tasks including the training exercise, the graphical elements of the simulation can, in some embodiments, be customized for a user. For example, the user may only make deliveries of a particular type of package (e.g., only a food container or one that has a unique label configuration). When determining a training exercise for this user, the graphical elements corresponding to the virtual package can be selected to represent the particular package. In this way, the user's virtual experience more closely matches their real-world experience, improving training efficacy.

In some embodiments, the training exercise can be presented to a user in response to a triggering condition. The triggering condition can include information that the user has opened a delivery application on their smartphone, or that the user is in the vicinity of a future delivery, or similar event. For example, the user can be at the beginning of a delivery route. The user can open the delivery application on their smartphone in preparation for making several package deliveries. In response to this, the user can be prompted on the smartphone that one or more training exercises is available for practice and be presented with an option to start the exercise. In other embodiments, the user can choose to start a training exercise directly without prompting. In these and other embodiments, determining the training exercise can be based on information corresponding to the triggering condition in addition to the user information. For example, the location of the user's smartphone could indicate that the user will be making deliveries primarily to apartment buildings, so that the training exercises can include tasks and graphical elements customized to apartment building deliveries.

As a specific example of the embodiments above, a user can be a delivery person delivering one or more packages to an apartment building. The user can have a user device like a smartphone through which they obtain information about their upcoming deliveries. The smartphone can identify the user and transmit user information to a server device to update user profile information included in a user profile. The user profile information can be used by a prediction module at the server device to predict that the user would benefit from a training exercise that explores one or more tasks corresponding to the apartment building deliveries. The prediction module can also use information about the upcoming deliveries to inform the prediction, including, for example, that one of the upcoming deliveries has a special delivery instruction that the user has never encountered before. Based on the prediction, the prediction module can construct a training exercise that includes the predicted beneficial tasks, potentially including a task corresponding to the special delivery instruction. Prior to beginning the package deliveries, the smartphone can detect that the user has arrived in the vicinity of the delivery location and has a few minutes before the deliveries need to be completed. Based on this triggering condition, the smartphone can then request and receive from the server device the determined training exercise. The smartphone can then present to the user an option to perform the training exercise. If the user opts to perform the exercise, the smartphone can then present a graphical simulation of the training exercise to the user on the smartphone screen. The graphical simulation can include images that depict the training tasks, including images of features that the user may encounter during a real-world delivery, like secured entrances to apartment buildings or an apartment mail room with a surveillance camera. The user can interact with the simulation by touching identified features to receive contextual information and provide responses representing decisions that the user would make during a physical delivery.

The techniques and methods described herein provide several advantages over conventional interactive training simulations. In particular, creating personalized training exercises can more effectively match a user to beneficial training content. Instead of imposing a rigid training simulation onto the user, the user is presented with numerous options allowing free exploration of the tasks. The training exercise is based in part on the user's own preferences for training so user engagement with the training is high. In addition, creating custom training exercises modularly from several training tasks can be done efficiently, since every possible combination of task need not be assembled into a separate training exercise prior to delivery to the user. If a delivery policy changes, only the affected training tasks need modification to comport with the new policy, not entire training exercises.

In addition, the techniques described herein provide one or more technical improvements to a user device and/or a server device implementing aspects of the techniques. For example, the accuracy of the predictions for training exercises may improve as additional user information is collected and updated based on user completion of training exercises. Accurate predictions may be made more rapidly and more efficiently by a prediction module or other software engine processing the model data. Performing the statistical modeling and prediction computations at the server device can free up resources on the user device to perform less resource-intensive operations. Moreover, in embodiments where the user device has sufficient resources to implement the prediction module, bandwidth may be preserved by reducing data transmission between the user device and the server device to transmission of user profile information, instead of transmitting whole training exercises and their graphical assets. The described user interface may enable more efficient navigation through a given training exercise compared to conventional user interfaces by more accurately simulating a virtual environment corresponding to the exercise, reducing inaccurate clicks, presses, and other user interactions.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Turning now to the figures, FIG. 1 is an example diagram 100 and associated flowchart showing a process 101 for implementing techniques relating to providing a personalized training exercise. The diagram 100 shows elements of a system corresponding to the blocks of the process 101. The process 101 can be performed by a user device 102, server device 104, or some combination of the two. In some embodiments, a prediction module 112, which may be implemented in the server device 104, may perform one or more of the techniques described herein, e.g., determine a training exercise 114 based on user profile information 110 and other inputs. In other embodiments, at least a portion of the prediction module 112 can be implemented on the user device 102 (e.g., a mobile device, a smartphone, etc.), for instance as part of an application configured to present the training exercise 114. The server device 104 may communicate with the user device 102 via one or more networks.

The process 101 can begin at block 116 by maintaining user profile information 110 corresponding to a user profile 108. The user profile 108 may be stored at the server device 104 as depicted. In some embodiments, the user profile 108 can be stored at the user device 102 or at a cloud device or other similar device. The user profile 108 can contain information corresponding a user, including user 106. Information corresponding to a particular user can include the user profile information 110. In several embodiments, the user profile information 110 can include one or more experience indicators for the user 106, including, but not limited to, the user's tenure, success metrics for physical package delivery, success metrics for training exercises, user preferences, and any other information representative of user experience. The experience indicators may also include information relating the user 106 to other users, for instance information identifying similarities among several users to improve targeting and personalization of the training exercise 114. As a specific example, the user profile information 110 for the user 106 may indicate that the user 106 has one year of experience delivering packages, completes 95% of all physical package deliveries successfully but is only 85% successful at deliveries to apartment buildings, completes training exercises successfully on the first attempt 75% of the time, and prefers to have training exercises focused on apartment deliveries since they encounter those types of deliveries infrequently. From this information, the user 106 can be related to other users in a similar cohort, e.g., users with fewer than two years of experience with less than a 90% success rate at apartment deliveries. The relation can then provide additional user profile information, including, for example, that users in that cohort improved their apartment delivery success rate after completing a number of training exercises corresponding to apartment deliveries.

Maintaining the user profile information 110 may include receiving, transmitting, or updating the experience indicators or other information. In some embodiments, the user device 102 can send to the server device 104 information corresponding to a user's success with the training exercise 114, so that the corresponding user profile information 110 can be updated. In other embodiments, including those in which the prediction module 112 is implemented at the user device 102, the user device 102 can receive user profile information 110 from the server device 104. The user profile 108 can be stored in a database or other data store that may be implemented in any of several hardware configurations, including a cloud configuration or other distributed configurations. Numerous other combinations of storing, updating, and receiving user information are contemplated in this disclosure and would be apparent to those with skill in the art.

Returning to the process 101, at block 118 a personalized training exercise 118 can be determined using the user profile information 110 and other information. The determination can be made based on the output of the prediction module 112 and can, in some embodiments, be made by the prediction module. In some embodiments, the prediction module 112 can include a predictive model or other statistical models that take as inputs the experience indicators from the user profile information 110. Other inputs into the prediction module 112 can include, in some embodiments, a governance model corresponding to policies governing physical package delivery and defining success criteria thereof, information about future physical package deliveries that the user 106 may perform, and an event or condition triggering or prompting the determination of a training exercise. For example, the governance model may indicate that a delivery policy has recently changed, for instance from a first policy to a second policy, such that the change may affect the user's performance of the corresponding physical package delivery. This indication can be input into the prediction module 112 to help determine a training exercise that emphasizes the changed policy so that the user 106 can explore the change in training prior to encountering it in a non-training scenario. Similarly, the prediction module 112 can receive information that one of the user's upcoming package deliveries corresponds to a delivery covered by the changed policy, so that the predicted training exercise may emphasize that particular type of delivery. Information about a future package delivery can include, without limitation, a delivery location, a delivery time, a delivery instruction, and any other suitable information that describes a future package delivery.

The prediction module 112 can output prediction information used to determine the training exercise 114. Although labeled as "prediction" information throughout this disclosure, in some embodiments the prediction information is not limited to predictions and can include information that determines learning content or training exercises based on non-predictive techniques discussed herein. This prediction information can correspond to a ranking of one or more topics of the training exercise 114 that would be most beneficial to the user 106. The topics may be the focus of the training exercise, for example, an exercise focused on a dog encounter or an exercise focused on an attended delivery. Whether the training exercise 114 is beneficial to the user 106 can be based upon the prediction information, such that an exercise predicted to improve the user's success criteria at a certain type of physical package delivery or to contain the user's preferred training scenarios would be beneficial. In some embodiments, the prediction information can be used to determine more than one training exercise 114 such that the user 106 may be presented with a list of possible training exercises from which to select. The ordering of the list may be such that the predicted most beneficial training exercise appears first so that it is more likely to be selected. Similarly, in some embodiments, the prediction information may be used to select the tasks that can be included in the training exercise based on whether the selected tasks provide benefit to the user 106 and are compatible with one another in the training exercise 114. For example, the prediction information may indicate that the training exercise should focus on attended delivery at an apartment building, wherein the user 106 is required to complete the task of leaving the package with the recipient or another designated person. The prediction information can also indicate that, based on other user profile information 110, the user 106 may benefit from a task corresponding to checking delivery instructions for a building access code to enter a premises. The prediction information can indicate that the building access task can be combined with the attended delivery task to create the training exercise 114, because these tasks are compatible in the same exercise.

In some embodiments, the prediction information can include a specific training exercise 114 with a set number and type of tasks. This scenario may occur when, for example, a policy in the governance model indicates that all users must receive a specific training exercise 114 without additional personalization or modification. In this instance, the determination of a personalized training exercise would result in only the specified training exercise being presented to the user 106.

In some embodiments, the determination of the training exercise 114 can include assigning a probability to one or more of the tasks included in the training exercise 114. The probability can correspond to the likelihood of that task occurring in the training exercise 114 at the point when the user 106 encounters that task. For example, the training exercise 114 may include the task of performing an attended delivery to a recipient at a house. The user 106 may have indicated that they prefer not to receive training on dog encounters because they feel that they are adept at following the required steps at handling the encounter. However, the prediction module 112 may indicate that a recent policy change for handling dog encounters may impact the user's ability to successfully navigate a future delivery to a house with a known dog. Because the user 106 prefers not to have training on dog encounters but the prediction module indicates that such training would be beneficial, the training exercise 114 can include a dog encounter task with a 20% probability of occurring. When the user 106 performs the training exercise 114 for attended delivery, they can then have a 20% chance of encountering a dog when they "approach" the house during the exercise.

In still other embodiments, the determination of a personalized training exercise 114 can include selecting graphical elements that correspond to the tasks included in the training exercise 114. While many graphical elements may be tied to the tasks already determined (e.g. graphics for an apartment building for an apartment delivery task), other graphical elements may be customized for the user 106. For example, the user 106 may only deliver food containers or packages with a particular label configuration. The training exercise 114 can then include a graphical depiction of the packages corresponding to the user's physical package deliveries. In this way the training exercise 114 may be more immersive for the user 106 and result in better training outcomes.

Returning now to the process 101, at block 120 the training exercise 114 can be presented at the user device 102 as a graphical simulation 122. The presentation can be made by a training application or other application running on the user device 102. The graphical simulation 122 can be any of a number of interactive visual experiences at the user device 102, including point and click, animated, three-dimensional perspective, virtual reality ("VR"), augmented reality ("AR"), or similar. The user device 102 may include a variety of example user devices that have a graphical interface, including computing devices, smartphones, stand-alone digital assistant devices, wearable device (e.g., eyewear, VR headset, or other suitable wearable device), tablet devices, laptop computers, desktop computers, and other such user devices. In some embodiments, the user 106 can interact with the graphical simulation 122 through a touch screen interface of the user device 102. This interaction can include selecting locations for package drop-off, selecting features to interact with like doors and trees, and selecting dialog buttons corresponding to choices the user 106 can make in the simulation. The user 106 can touch identified areas of the screen to receive more information about the scenario or be presented with options for how to proceed with the delivery. Because the graphical simulation 122 corresponds to package delivery, the user 106 may have access to a virtual representation of their user device within the simulation, such that tasks performed using the device for physical package delivery (e.g., taking a picture of the package at the delivery location) can be performed in the simulation by interacting with the virtual user device.

The presentation of the graphical simulation 122 can, in some embodiments, be in response to a triggering condition or other event. The triggering condition can include, without limitation, starting an application at the user device 102, the user 106 responding to a notification, the user 106 selecting an option for a training exercise, detecting a period of down time for the user 106 before a new package delivery, identifying a current location of the user device 102, detecting that a future package delivery includes a physical task corresponding to one of the tasks in the training exercise 114, detecting a time according to a schedule determined by the user 106 or other scheduler (e.g., at the start of every shift or every Monday at 12:00 p.m.), detecting a route assignment, detecting a package delivery assignment, determining that the user 106 received a promotion or otherwise had their duties modified, determining that the user 106 has been assigned a different vehicle (e.g., car vs. bike), and other similar conditions. For example, the user 106 may be about to begin a delivery shift in a neighborhood. Upon arriving early at the neighborhood with several physical package deliveries, the location of the user's device 102 can indicate that the user 106 is about to make several deliveries but has a short window of time before the first delivery is scheduled to be made. The user device 102 may prompt the user 106 that they may have a suitable period of time in which to practice a training exercise corresponding to a task in one of their upcoming deliveries. In other embodiments, the user 106 can actively choose to begin a training exercise by selecting an option to perform training. By selecting the option, the user device 102 may present a list of possible training exercises identified by the training focus. Selecting one of the listed exercises can then trigger the device to present the training exercise 114 corresponding to the selection. In some embodiments, the selection of the exercise can also trigger the determination of a personalized training exercise 114 as described herein. For example, a particular training exercise corresponding to a dog encounter may not be determined for the user 106 unless and until the user 106 selects that option from the list, at which point the training exercise 114 is determined and presented to the user 106 at the user device 102.

At block 124, the user 106 can interact with the graphical simulation 122 at the user device 102 as described above. In response, at block 126, the graphical simulation 122 can be modified to become a different graphical simulation 128. In some embodiments, the user interaction can be performing a first task incorrectly or out of order, or omitting a required task early in the simulation. Although in many embodiments the user 106 has the freedom to negotiate the training exercise 114 without incorrect or out of sequence choices limiting the completion of the exercise, in some embodiments it may be beneficial to modify the simulation to account for the user's behavior. Modifying the graphical simulation can include, in some instances, changing a graphical element of a later task or changing the occurrence probability of a later task. For example, the graphical simulation 122 may represent the training exercise 114 that includes an attended delivery to a house, with a 20% chance that the user 106 encounters a dog. However, the user 106 omits a first task (e.g., checking delivery notes). In response, the probability of encountering the dog can be increased to 50% when the user 106 interacts with the modified graphical simulation 128.

Figure 2:
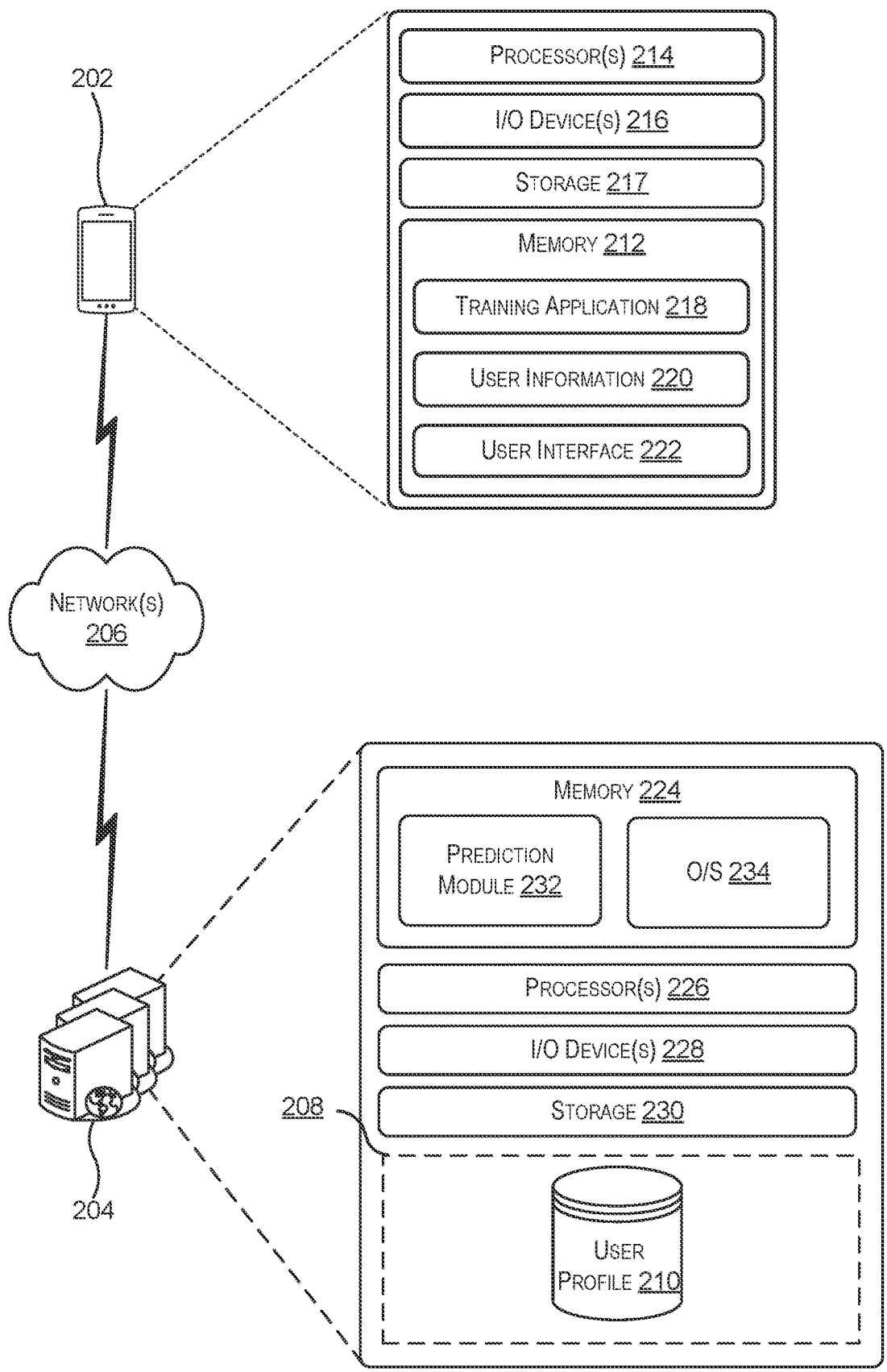
FIG. 2 is a simplified block diagram illustrating an example architecture of a system for determining a training exercise, according to some embodiments.

FIG. 2 is an example schematic architecture for implementing techniques for determining a personalized training exercise, according to some embodiments. The diagram includes a user device 202, a server device 204, and one or more network(s) 206. Each of these elements depicted in FIG. 2 may be similar to one or more elements depicted in other figures described herein. For example, the user device 202 may be similar to the user device 102 or other user devices, the server device 204 may be similar to server device 104, and so on.

As described herein, the user device 202 can have at least one memory 212, one or more processing units (or processor(s)) 214, and one or more input/output ("I/O") device(s) 216. The processor(s) 214 may be implemented as appropriate in hardware, computer-executable instructions, firmware or combinations thereof. Computer-executable instruction or firmware implementations of the processor(s) 214 may include computer-executable or machine executable instructions written in any suitable programming language to perform the various functions described. The I/O device(s) 216 can include displays, monitors, touch screens, mouse, keyboard, or other I/O device.

The memory 212 may store program instructions that are loadable and executable on the processor(s) 214, as well as data generated during the execution of these programs, including user information 220. Depending on the configuration and type of user device 202, the memory 212 may be volatile (such as random access memory ("RAM")) or non-volatile (such as read-only memory ("ROM"), flash memory, etc.). In some implementations, the memory 212 may include multiple different types of memory, such as static random access memory ("SRAM"), dynamic random access memory ("DRAM") or ROM. The user device 202 may also include additional storage 217, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some embodiments, the storage 217 may be utilized to store data contents received from one or more other devices (e.g., server device 204). For example, the storage 217 may store user profile information.

The memory 212 may include one or more application programs or services for implementing the features disclosed herein, including a training application 218 and a user interface 222. For example, the training application 218 may, in conjunction with the user interface 222, be used to present a training exercise, for instance the training exercise 114 of FIG. 1, to a user through an I/O device like a display or touch screen. The user interface 222 may include code that causes the processor(s) 214 to present a graphical simulation of the training exercise and receive inputs from the user representing interactions with the simulation. The training application 218 can be, in some embodiments, an application specifically configured to present training exercises like those described herein. The training application 218 can include a graphical engine, graphical assets, and other software representing the individual training tasks or determined training exercises. In other embodiments, the training application 218 is a general purpose application like a Web browser that can be configured to receive application data from another device, for instance a Web server, application server, or other server device like server device 204 in communication with the user device 202 over one or more of the network(s) 206. In these embodiments, the graphical simulation can be presented in the browser like many other types of interactive media including video games, interactive web pages, or the like. In some other embodiments, the training application 218 can be configured to perform one or more operations described herein with regard to the server device 204 including implementing a prediction module 232 and determining training exercises based on user profile information from user profile 210 or other information from data storage 208. User profile information received from the server device 204 or data storage 208 may constitute user information 220 at the user device. The user information 220 can include information about the user of user device 202, including the user's success metrics for completed or attempted exercises and can, in some embodiments, be transmitted to the server device 204 to update the user profile 210.

The server device 204 may be a computer system that includes at least one memory 224, one or more processor(s) 226, I/O devices 228, and a storage unit 230. As with the processor(s) 214 of user device 202, the processor(s) 226 may be implemented as appropriate in hardware, computer-executable instructions, software, firmware, or combinations thereof. Computer-executable instruction, software, or firmware implementations of the processor 226 may include computer-executable or machine-executable instructions written in any suitable programming language to perform the various functions described. The memory 224 may store program instructions that are loadable and executable on the processor(s) 226, as well as data generated during the execution of these programs, including user profile information corresponding to the user profile 210. Depending on the configuration and type of memory included in the server device 204, the memory 224 may be volatile (such as RAM) and/or non-volatile (such as read-only memory ("ROM"), flash memory, or other memory). The server device may also include data storage 208. In some embodiments, the data storage 208 may include one or more databases, data structures, or the like for storing and/or retaining information associated with the server device 204. The data storage 208 may include a database for storing user profile 210.

In some embodiments, the user profile 210 may be similar to user profile 108 described above with respect to FIG. 1. It may be used to retain user profile information pertaining to users of the server device 204 such as the user 106. The user profile information may be the same or similar to the user profile information 110, and can include, for example, user preferences, user tenure, user success metrics for past physical package deliveries, user success metrics for training exercises, and any other information about the user that can be the basis for a prediction of a training exercise.

The memory 224 may include an operating system 234 and one or more application programs, modules, or services for implementing the features disclosed herein, including the prediction module 232. In some embodiments, the prediction module 232 may be similar to the prediction module 112 described with respect to FIG. 1. The prediction module 232 may include code that causes the processor(s) to retrieve or receive information, including user profile information, outputs from one or more statistical models, triggering information from the user device 202, or information corresponding to physical package delivery, in order to generate prediction information corresponding to a personalized training exercise. In some embodiments, the prediction module 232 can be configured to receive and assemble software assets representing one or more tasks to create the training exercise. In other embodiments, the prediction module 232 can be part of a larger training module that also includes the statistical models used by the prediction module 232 to generate prediction information. This training module can also be configured to send the training exercise determined by the prediction information to the user device 202 over one of the network(s) 206 for presentation to a user. The prediction module 232 can further be configured to receive user information 220 from the user device 202 and use the user information 220 to modify the prediction information and the training exercise.

Figure 3:
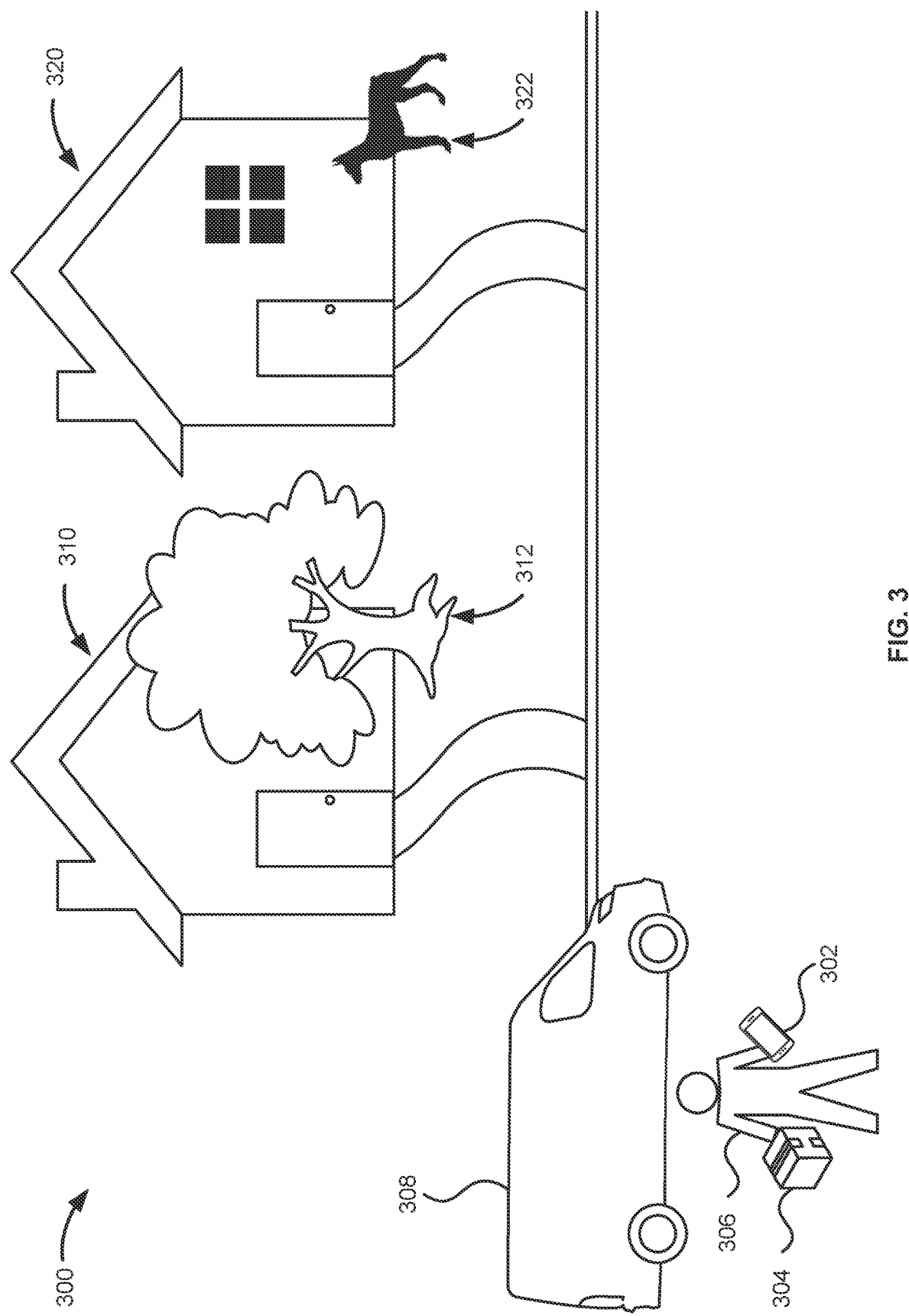
FIG. 3 is a schematic illustrating a package delivery scenario, according to some embodiments.

FIG. 3 illustrates a scenario 300 representing a driver 306 preparing to make physical package deliveries from a delivery vehicle 308 to homes 310, 320. The driver 306 may, in some embodiments, correspond to users described herein, including user 106. Similarly, user device 302 may correspond to other user devices, including user device 102.

As depicted in scenario 300, home 310 can be a residential house distinguished by the presence of a tree 312. A physical package delivery to home 310 may include special delivery instructions to place the package 304 out of view behind the tree 312, such that the package 304 is not visible from the road or sidewalk. The delivery instructions may also identify the home by its distinguishing tree 312 in addition to its address, to aid the driver 306 in delivering the package 304 to the correct home. Home 320 can be a residential house at which lives a dog 322. A physical package delivery to home 320 may include special delivery instructions indicating the presence of the dog and providing instructions to the driver for how to handle the delivery. For example, the instructions may include information to contact a resident of the home 320 upon arrival so that the dog 322 may be corralled or otherwise prevented from encountering the driver 306. In some cases, the presence of the dog may not be known to the driver 306 until the driver 306 arrives at the premises. In these cases, the driver 306 may be required to contact a delivery supervisor or other personnel to request additional instructions or may need to attempt to contact a resident of home 320 by looking up delivery information on the user device 302. In both cases, the physical package delivery includes one more physical tasks that need to be completed correctly by the driver 306 to have successful deliveries.

As scenario 300 relates to the techniques described herein, the driver's arrival in the vicinity of the homes 310, 320, can, in some embodiments, constitute a triggering condition for the determination or presentation of a training exercise to the driver 306. The triggering condition can also be recognition, via the user device 302, that the driver 306 has a period of time before the next physical package deliveries need to be completed wherein a useful training exercise can be performed. If the period of time exceeds a threshold corresponding to an estimated time to complete a training exercise, the user device 302 may present one or more training exercises to the driver 306 that are short enough to be completed within the detected period of time. In some embodiments, the user device 302 may prompt the driver 306 that potentially helpful training exercises have been determined and customized for the driver 306, such that the driver 306 can opt to perform one or more the exercises.

Training exercises determined for the driver 306 can be based on information corresponding to the upcoming physical package deliveries to homes 310, 320. For example, the user device 302 may present to the driver 306 an option to select a training exercise that involves simulated tasks for correctly placing the package 304 out of view behind a hedge or a tree, as may be required at home 310. The user device 302 may also present an option to select a training exercise that involves simulated tasks for handling a dog, as may be required at home 320. As described in more detail below with respect to FIG. 4, both options may be presented to the user as part of a list. In some embodiments, the order can be based on which training exercise is predicted to be most helpful to the driver 306. For example, the delivery to home 320 may have delivery instructions indicating the presence of a dog, which can provide information to the predictive model that a dog encounter is likely. Because dog encounters may require specific tasks not frequently encountered by the driver 306, a training exercise focused on a dog encounter may be prioritized over a training exercise focused on delivering a package out of view. Prioritizing one training exercise over another can include visual highlights or other indications within the training program or application, or can include placing the option to start the dog encounter training exercise first in a list of training exercise options.

Training exercises can also be determined based a upon a change in policies governing the physical package deliveries, according to some embodiments. For instance, a physical package delivery requiring the package be left out of view may have been previously governed by a policy that allowed the delivery person to select an out of site location along the side of the house, away from the front door. A policy change may now require the delivery location to be within a certain distance of the door or porch of the house while still being out of sight. Continuing this example, the driver 306 may be familiar with the old policy, such that the delivery to home 310 could be successfully accomplished by placing the package out of sight along the side of home 310, for example the side between home 310 and home 320. The driver's user profile information may indicate that the driver 306 has not successfully acclimated to the new policy in recent deliveries. A training exercise emphasizing the policy change could be determined and presented to the driver 306 prior to making the package delivery at home 310.

Upon completing the physical package deliveries to homes 310, 320, the driver's user profile can be updated with information regarding the success of those deliveries with respect to success criteria. Similarly, if the driver 306 attempted or completed one or more training exercises prior to making the physical package deliveries, the results of those exercises can also be incorporated into the user profile information.

Figure 4:
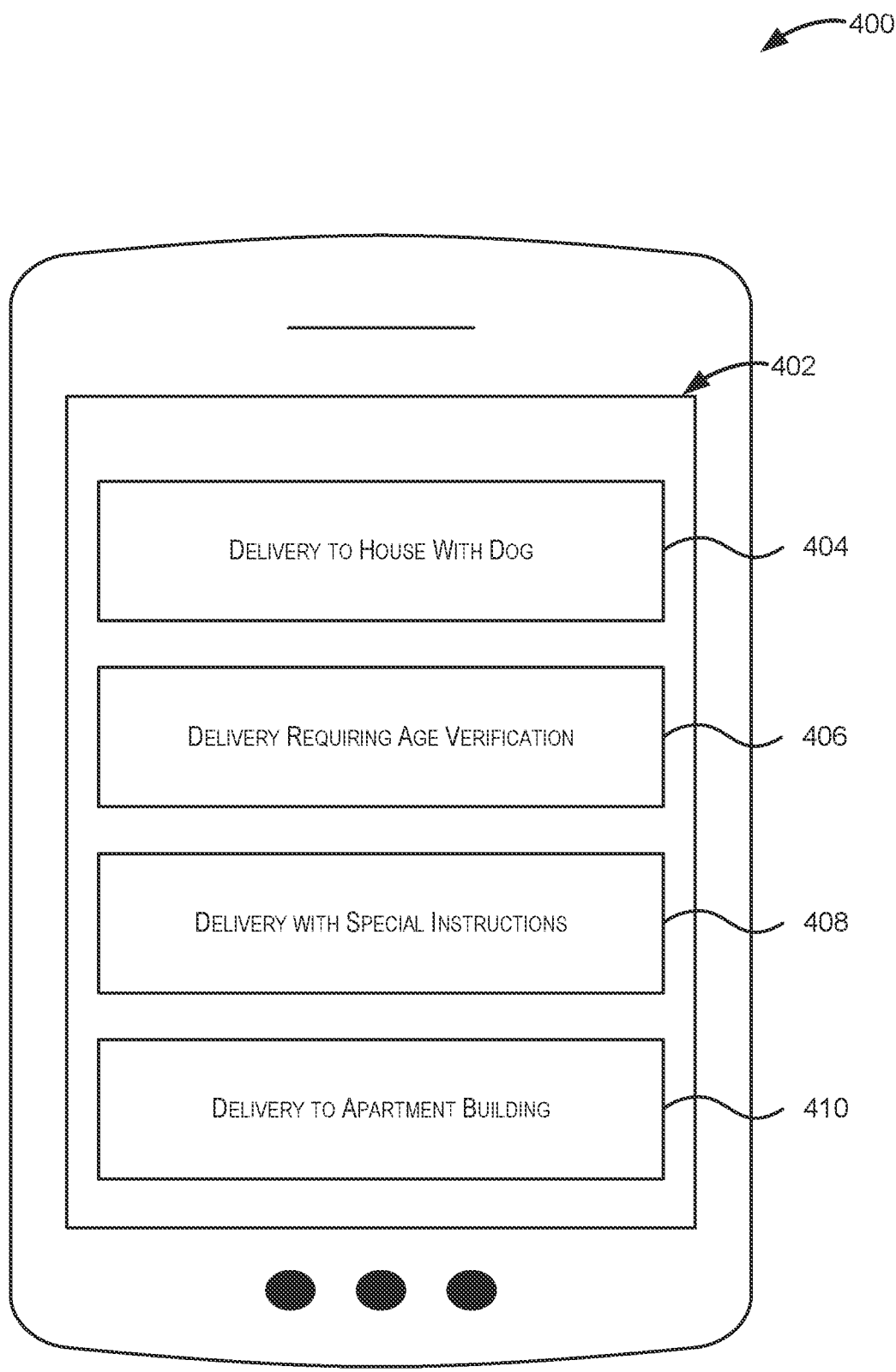
FIG. 4 is another simplified block diagram illustrating a graphical user interface ("GUI") of a user device for presenting a graphical simulation of a training exercise, according to some embodiments.

FIG. 4 depicts a user device 400 displaying a GUI 402 with options for several training exercises, according to some embodiments. As described herein, user device 400 can be similar to other user devices, while the training exercises 404-410 may correspond to one or more training exercises. As shown, the list of options for four different training exercises can include exercise 404 focused on a delivery to a house with a dog, exercise 406 focused on a delivery requiring an age verification of a recipient, exercise 408 focused on handling one or more special instructions, and exercise 410 focused on a delivery to an apartment building.

As described herein with respect to several embodiments, a training exercise can include one or more tasks. The training exercise can also have a focus on a particular scenario, event, or other distinguishing feature of the delivery for which a customized training exercise may be beneficial to the user. In these embodiments, the exercises identified with a particular focus will have at least one task that corresponds to the focus event or scenario. For example, exercise 404 will have at least one task that corresponds to a dog encounter. In this way, a user's freedom to choose their own approach to the training exercises is not thwarted by an incorrectly personalized training exercise. However, the exercises 404-410 may have one or more tasks that correspond to another focus feature that is not the focus of the training exercise. For example, exercise 406 may have tasks corresponding to both age verification and a dog encounter. Likewise, exercise 410 may have tasks corresponding to delivering a package to an apartment mailroom and following special delivery instructions from the recipient.

In some embodiments, the options displayed at the GUI 402 can correspond to training exercises that were previously determined, such that when the user selects one of the options the training exercise has already been created with its series of tasks and events. In other embodiments, the options presented at the GUI 402 can identify at least one task that the user would prefer to be in the subsequent training exercise. The selection of that option can then be a trigger that causes, for example, a prediction module at a server device to determine and customize a training exercise based on: the option selected, the user profile information, the predictive model, and other relevant information for constructing a training exercise described herein. For example, the user may want to perform training for a delivery to an apartment building. The user can touch or click or otherwise interact with the displayed option for exercise 410. Prior to this interaction, no training exercise existed for the user, such that selecting the exercise 410 option triggered the creation of a predicted beneficial training exercise that includes a task corresponding to a delivery to an apartment building.

Figure 5:
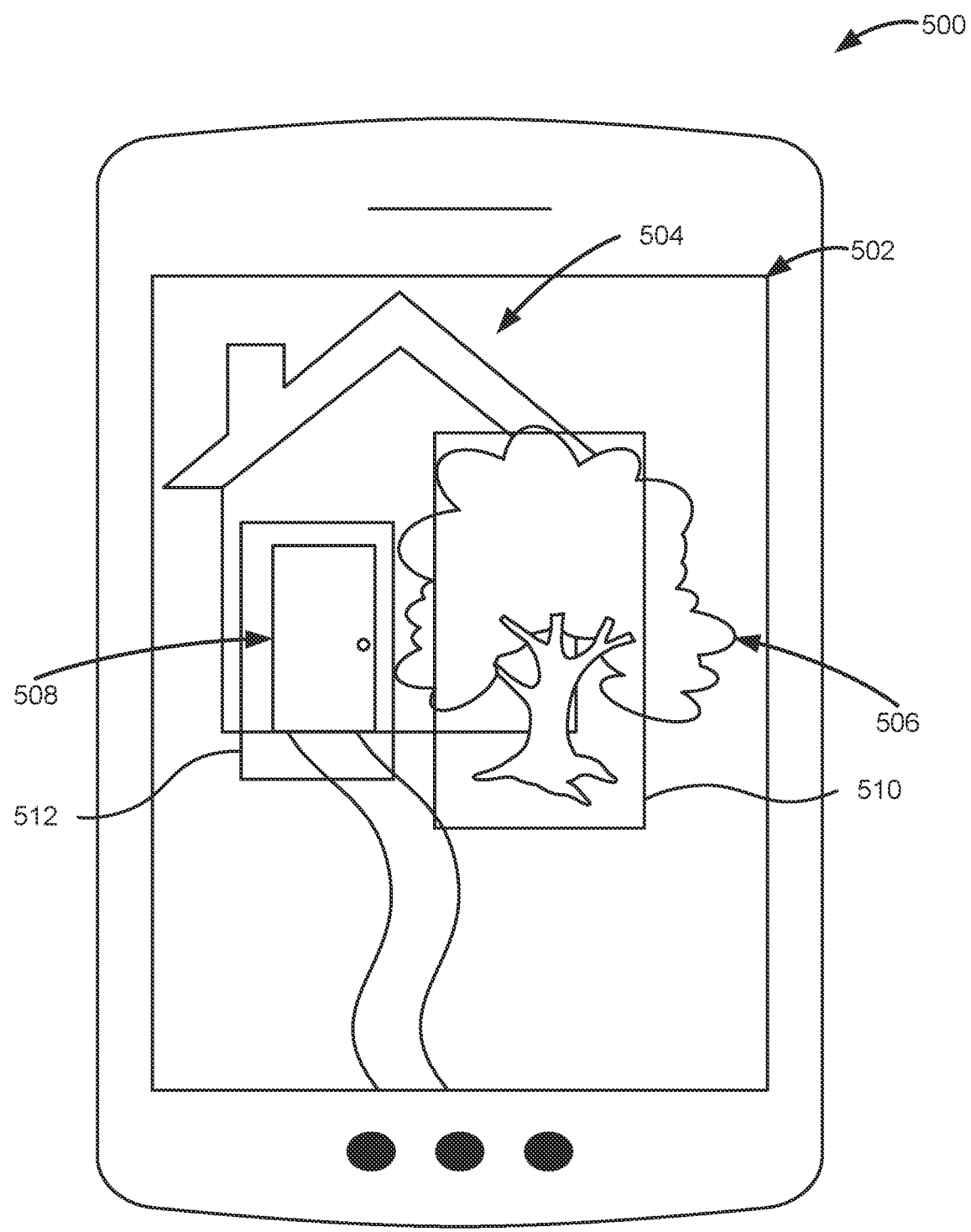
FIG. 5 is a diagram illustrating a GUI of a user device presenting interactive graphical features of a graphical simulation, according to several embodiments.

FIG. 5 illustrates a GUI 502 of a user device 500 presenting several interactive features as part of a graphical simulation of a training exercise, according to some embodiments. User device 500 may be similar to other user devices described herein, and may, in an embodiment, be similar to the user device 400 as described with respect to FIG. 4. Similarly, the GUI 502 be similar to GUI 402 and may display portions of the training exercise 408.

As depicted, the graphical simulation can display graphical elements and icons corresponding to scenery, features, and objects present during a physical package delivery. These elements can include a home 504 that includes a tree 506, a door 508, and respective interaction indicators 510, 512. The interaction indicators may depict regions of the graphical simulation with which the user may interact, e.g., by touching the corresponding area bounded by the indicator on a touch screen. As an example, the user can touch the tree 506 anywhere within the indicator 510 to cause the simulation to present additional graphical elements corresponding to that interaction. Touching the tree 506 can bring up an informational prompt identifying with text what is depicted graphically (e.g., "You see here a large tree in front of the house."). In some embodiments, the text prompts can include options or choices for the user to make to advance the simulation. Responding to those prompts can involve touching an identified button or other interactive icon displayed at the GUI 502.

In an embodiment, the graphical simulation presented at GUI 502 may be similar to the simulation corresponding to training exercise 408, which focused on a delivery with special instructions. By way of example, that special instruction may be to place a package out of sight behind the large tree 506 in front of the home 504. As the user progresses through the graphical simulation, they can interact with the tree 506 via the interaction indicator 512 to place the package in the correct location. The user can also interact with the door 508 via the interaction indicator 514, which may provide an option to leave the package at the door. Selecting that option would be the incorrect choice, but the simulation may not end if an incorrect action is taken.

Figure 6:
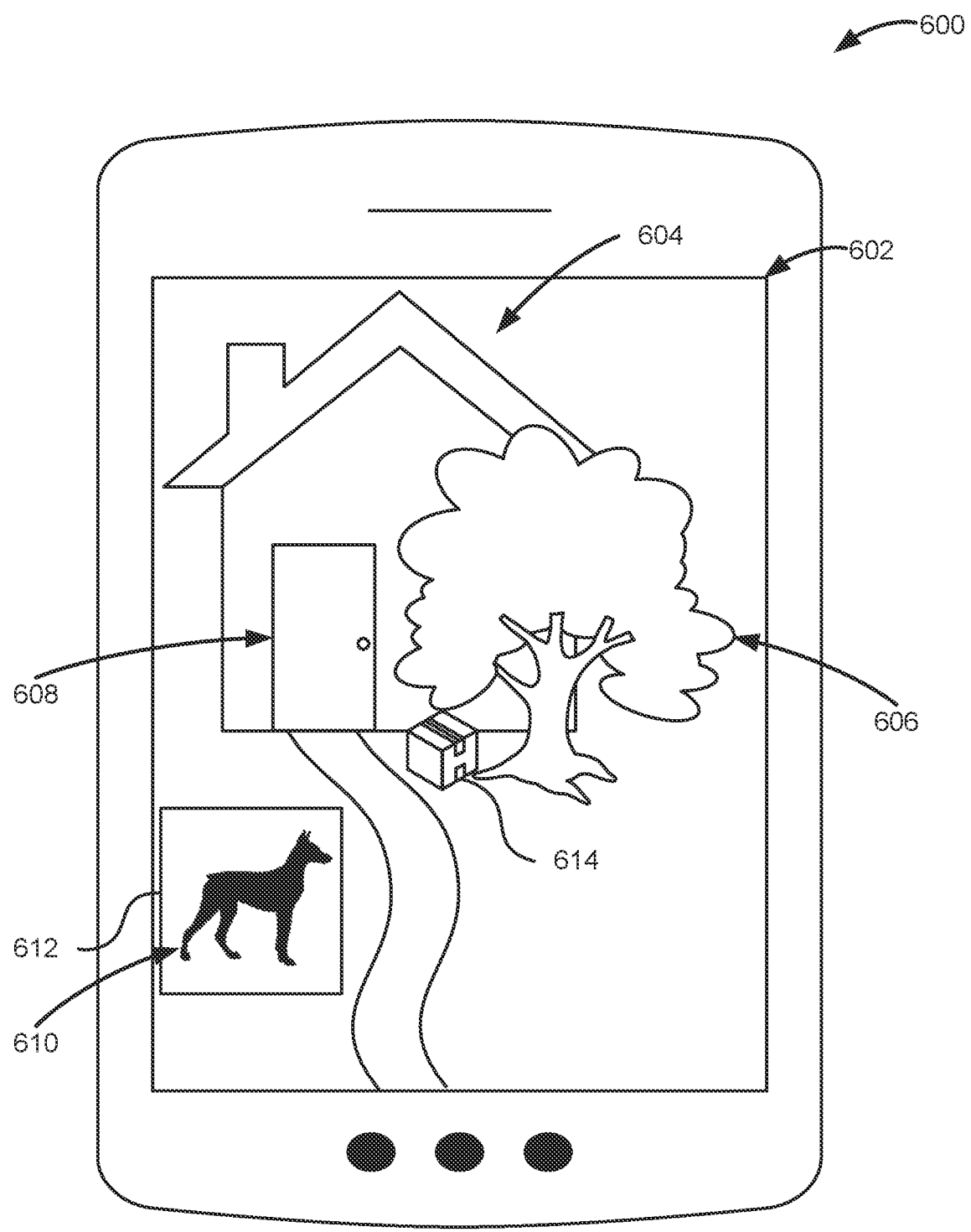
FIG. 6 is another diagram illustrating a GUI of a user device presenting specific graphical features of a graphical simulation, according to an embodiment.

FIG. 6 illustrates a GUI 602 of a user device 600 presenting graphical elements corresponding to a modification of the training exercise based on a user interaction. The GUI 602 and user device 600 may be similar to those described with respect to FIG. 5 above. By way of continuing example, the graphical simulation illustrated in FIG. 6 can be a continuation of the graphical simulation illustrated in FIG. 5 corresponding to exercise 408, where the home 604, tree 606, and door 608 correspond to the similar elements described therein.

As described herein with respect to several embodiments, the training exercise is not static even when the user is performing it. One or more tasks included in the training exercise may occur based on a probability assigned when the exercise was first determined. For example, although exercise 408 focuses on a delivery with a special delivery instruction, the exercise can include the potential for a task corresponding to a dog encounter. The encounter with the dog 610 may only have a 20% chance of occurring when the user advances to the point of the simulation of approaching the home 604. If the dog encounter task does not occur, then the graphical elements for the dog 610 and the corresponding interaction indicator 612 do not appear in the simulation. The probability may, in some embodiments, be modified while the user interacts with the graphical simulation. For instance, the 20% chance may become a 50% chance if the user takes certain actions earlier in the simulation, like omitting or incorrectly performing one or more tasks at the beginning of the simulation. Whether or not the dog encounter occurs, the tasks corresponding to the special delivery instructions may remain unmodified so that the original focus of the exercise remains intact.

Graphical elements within the simulation can also be personalized for the user. The package 614 can be shown in the simulation as it would appear to the user during a physical package delivery. For example, if the user exclusively delivers food containers, then the package 614 that appears in the simulation can be a food container. The appearance of the package 614 within the simulation may have functional attributes, in some embodiments. For example, certain parcels that a user delivers may have a unique label configuration. One of the tasks in a training exercise can be to "scan" the label, where success is measured by selecting the correct bar code or optical code to scan on the package label. By selecting graphical elements that correspond to the unique, functional appearance of some packages, the simulation can provide a greater degree of training benefit to a user.

Figure 7:
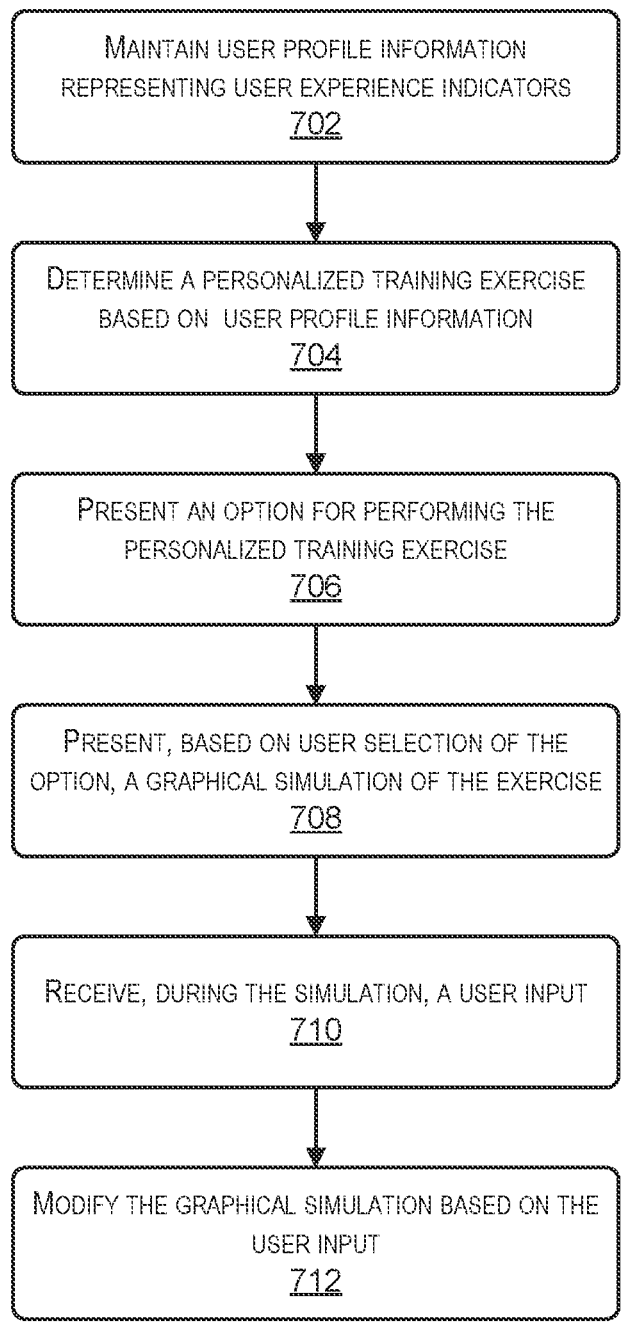
FIG. 7 is a simplified flow diagram of an example process for determining a personalized training exercise, according to some embodiments.

FIG. 7 illustrates an example flow diagram showing process 700 as described herein. The process 700 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Some, any, or all of the process 700 may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program including a plurality of instructions executable by one or more processors. The computer-readable storage medium is non-transitory.

FIG. 7 is a flow diagram of a process 700 depicting example operations for implementing techniques for determining a personalized training exercise based on user information, according to an embodiment. The process 700 may be performed by a computing device, including the user devices 102 of FIG. 1 or 302 of FIG. 3.

The process 700 can begin at block 702 with the user device maintaining user profile information corresponding to user experience indicators. Maintaining the user profile information can include storing, updating, and/or retrieving information contained within a user profile database or other data store. Maintaining the user profile information can also include synchronizing a user profile between the user device and a server device or other device, adding or removing user profiles, and any other data handling operation for user profiles. The user experience indicators can include a user's tenure, success metrics for physical package delivery, success metrics for training exercises, user preferences, and other information pertaining to a user.

At block 704, a personalized training exercise can be determined based upon the user profile information maintained at block 702. Determining a training exercise may include a prediction module processing information from the user profile, predictive models and other statistical models, and trigger information to assemble a training exercise from one or more tasks. In some embodiments, the prediction module is implemented on the server device, so that the training exercise is determined and assembled at the server device and then transmitted to the user device for presentation to the user. In other embodiments, the prediction module can send a prediction, prediction information, or a determination for the training exercise to a training application or other application implemented on the user device, such that the training application can assemble the training exercise based on the prediction. The training exercise can be the exercise predicted to provide the most training benefit to the user while still complying with user preferences and taking into account future package deliveries and other information relevant to the user. The user profile information can be one or more experience indicators including, but not limited to, user tenure, user success metrics for physical package delivery, user success metrics for personal training exercises, user preferences, or similarity of the user profile with other user profiles.

In some embodiments, the prediction can be based on one or more delivery policies that govern a physical package delivery and can define criteria for a user's success at the physical delivery. For example, a delivery policy can define the acceptable locations to leave a package at a delivery location, the order in which certain delivery tasks must occur, procedures for interacting with a package recipient, and other rules that a delivery person must follow. The prediction can also be based on the difference between the delivery policies, for instance if a policy changes. The prediction module can determine that a user may be unfamiliar with a recent change in delivery policies or that an upcoming physical package delivery must comply with a new policy for which the user has not been subject to in any earlier deliveries. In this way, several embodiments of the present disclosure allow for training exercises to be personalized to a user based on changing policies or rules that determine delivery success.

Similarly, in some embodiments, the prediction can be based on one or more characteristics of a future package deliver that the user may be scheduled to make. These characteristics can include a time for the delivery, the location of the delivery, any special delivery instructions pertaining to the delivery, and other such characteristics. For example, the prediction module can receive information that the user will be making several deliveries to apartment buildings during their next shift, such that the prediction for a training exercise for the user may include tasks corresponding to deliveries at apartment buildings. In some embodiments, the prediction can also be based on a triggering condition, including the triggering conditions discussed below with respect to block 706 of process 700. In still other embodiments, the prediction module can determine a training exercise based on an existing training exercise, such that the training exercise determined for the user is not modified or changed from the existing training exercise. In these embodiments, the training exercise determined for the user can be the predetermined training exercise. This situation can correspond to, for example, the case where the user is required to perform a specific training exercise that cannot be modified based on the prediction information output from the prediction module, e.g., mandatory training.

At block 706, the user device may present an option for performing the determined training exercise. This option can be in the form of a prompt or notification at the user device, such as a push notification on a smart phone. The option can be presented in response to a triggering condition or event that corresponds to an event that may indicate that training would be suitable or beneficial for the user. The triggering condition can include, without limitation, the user opening an application on the user device, detecting that the user device is in the vicinity of upcoming package deliveries, the user requesting a training exercise directly, detecting that an upcoming physical package delivery has tasks similar to one or more tasks in the training exercise, a scheduled training time, the assignment of a new delivery route to the driver, the assignment of a new delivery type to the user, the assignment of a different delivery vehicle than the user is accustomed to, or other event like those described herein with regard to other triggering conditions.

At block 708, the user device can present to the user a graphical simulation of the training exercise. The graphical simulation can take several forms, including an interactive point and click game representing the one or more tasks within the exercise. The graphical elements shown in the simulation can also be determined based on the user profile information and predictive information as in block 704. The graphical elements can include one or more images representing visually aspects of the tasks included in the training exercise. The user is free to navigate through the simulation however they wish and is not constrained by performing any of the tasks correctly.

At block 710, the user device can receive input from the user corresponding to an interaction with the simulation. The interaction can take the form of selecting options presented graphically in the simulation by clicking on them or touching them on a touch screen. Based on the user interaction, at block 712, the user device can modify the graphical simulation corresponding to a modification of the underlying training exercise. The modification can include changing the occurrence probability of an optional task within the exercise, so that that task is more or less likely to occur based on the user interaction. In some embodiments, the modification can also include changing one or more graphical elements of a later task in response to the user interaction with an earlier task of the training exercise.

Although the steps and operations of process 700 have been described with respect to the user device 102 or 302 performing some or all of the steps, some or all of the steps may be performed at a server device 104 or 204, for example by having the prediction module implemented within the server device to predictively determine the training exercises.

Figure 8:
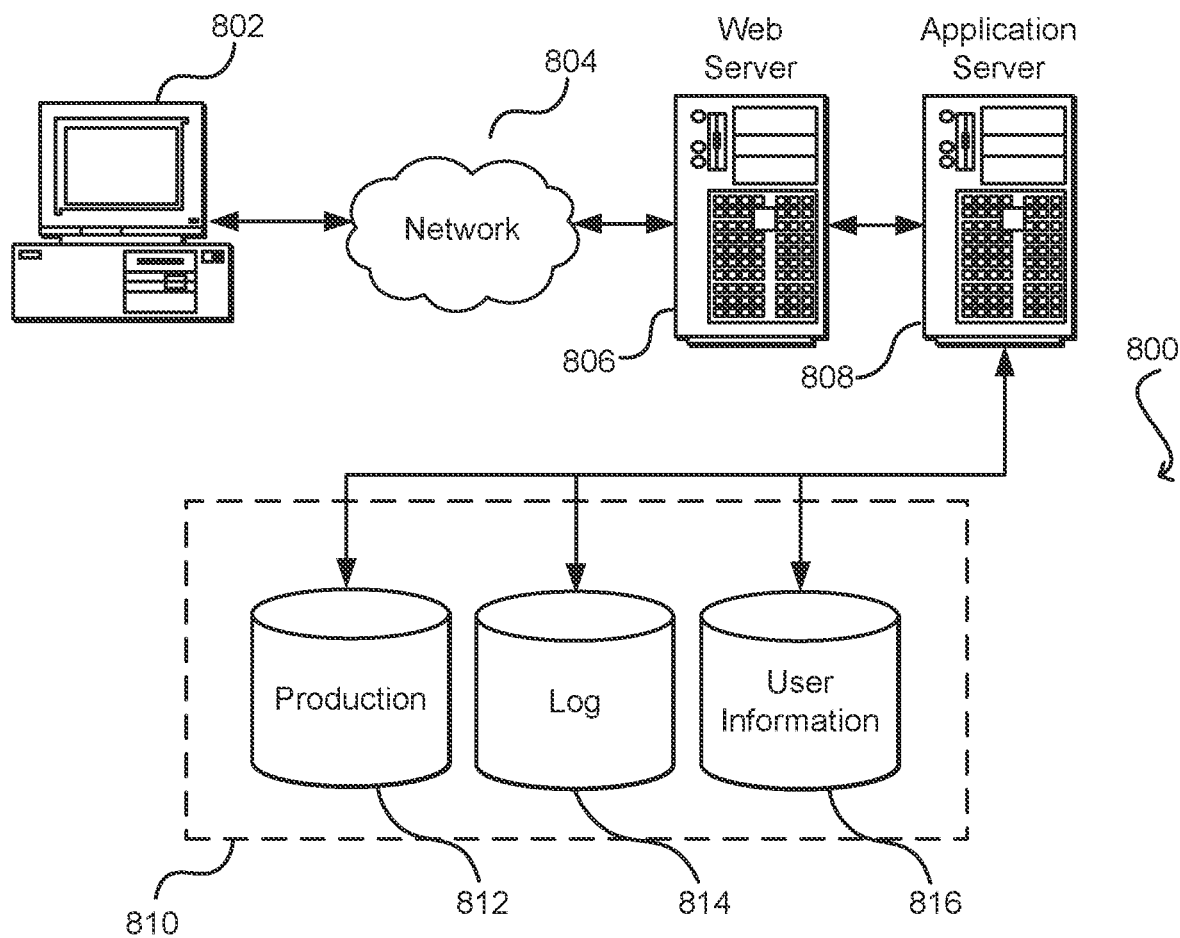
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the environment 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, SAP®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media or computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. One or more non-transitory computer-readable media comprising computer executable instructions that, when executed by one or more computer systems, cause a user device to perform operations comprising:
   maintaining user profile information associated with a user profile, the user profile information representing user experience with respect to a plurality of experience indicators corresponding to physical package delivery;
   determining, based at least in part on prediction information, a personalized training exercise representing simulated package delivery, the prediction information based on the user profile information, the personalized training exercise comprising a plurality of tasks associated with one or more images representing the plurality of tasks;
   responsive to a triggering condition, presenting, at a user device, an option for performing the personalized training exercise;
   based at least in part on user selection of the option, presenting, at the user device, a graphical simulation for performing a first task of the plurality of tasks;
   receiving, during the graphical simulation, a user input corresponding to performance of the first task of the plurality of tasks; and
   modifying, during the graphical simulation and based at least in part on the performance of the first task, a second task of the plurality of tasks by at least selecting a new image representing the second task.

2. The one or more non-transitory computer-readable media of claim 1, wherein maintaining the user profile information comprises:
   receiving user profile information from the user profile; and
   updating the user profile with user success metrics for the personalized training exercise.

3. The one or more non-transitory computer-readable media of claim 2, wherein the plurality of experience indicators further corresponds to simulated package delivery and comprises one or more of user tenure, user success metrics for physical package delivery, user success metrics for personal training exercises, user preferences, or similarity of the user profile with other user profiles.

4. The one or more non-transitory computer-readable media of claim 1, further comprising additional computer-executable instructions that, when executed by the one or more computer systems, cause the user device to perform operations comprising receiving the prediction information from a server system separate from the user device, wherein the prediction information comprises output from a predictive model maintained by the server system, the user profile information comprising an input into the predictive model.

5. The one or more non-transitory computer-readable media of claim 4, wherein the triggering condition comprises at least one of starting an application at the user device, responding to a notification, detecting a period of time exceeding a threshold before a new package delivery, identifying a current location of the user device, detecting that a future package delivery includes a physical task corresponding to any task of the plurality of tasks, or selecting an option to begin the personalized training exercise.

6. A computer-implemented method, comprising:
   maintaining a user profile comprising a plurality of metrics corresponding to physical package delivery;
   determining, based at least in part on prediction information, a training exercise representing simulated package delivery, the prediction information based at least in part on the user profile, the training exercise comprising a plurality of tasks associated with one or more images representing the plurality of tasks;
   responsive to a triggering condition, presenting, at a user device, a graphical simulation for performing a first task of the plurality of tasks;
   receiving, during the graphical simulation, a user input corresponding to performance of the first task of the plurality of tasks; and
   modifying, during the graphical simulation and based at least in part on the performance of the first task, a second task of the plurality of tasks by at least selecting a new image representing the second task.

7. The computer-implemented method of claim 6, wherein the plurality of metrics comprises one or more of user tenure, user success metrics for physical package delivery, user success metrics for training exercises, user preferences, or similarity of the user profile with other user profiles.

8. The computer-implemented method of claim 7, wherein the prediction information is further based on delivery policies comprising criteria for successful completion of physical package delivery.

9. The computer-implemented method of claim 8, wherein:
a first policy of the delivery policies differs from a second policy of the delivery policies; and
determining the training exercise further comprises predicting a change in the user success metrics for physical package delivery corresponding to the difference between the first policy and the second policy.

10. The computer-implemented method of claim 6, wherein:
the plurality of tasks are a plurality of training tasks; and
the prediction information is further based at least in part on a future package delivery comprising a plurality of physical tasks corresponding to the plurality of training tasks.

11. The computer-implemented method of claim 10, wherein the future package delivery comprises one or more of a delivery location, a delivery time, or a delivery instruction.

12. The computer-implemented method of claim 6, wherein the triggering condition comprises at least one of a scheduled time, a delivery route assignment, a package delivery assignment, or a change in an assigned delivery vehicle.

13. The computer-implemented method of claim 6, wherein determining the training exercise is further based on a specific training exercise having a set number of tasks, wherein the plurality of tasks of the training exercise comprises the set number of tasks of the specific training exercise.

14. The computer-implemented method of claim 6, wherein the one or more images comprise graphical elements having functional attributes corresponding to the performance of the plurality of tasks.

15. A user device, comprising:
a memory configured to store computer-executable instructions; and
a processor configured to access the memory and execute the computer-executable instructions to at least:
maintain a user profile comprising a plurality of metrics corresponding to physical package delivery;
determine, based at least in part on prediction information and a triggering condition, a training exercise representing simulated package delivery, the prediction information based on the user profile, the training exercise comprising a plurality of tasks associated with one or more images representing the plurality of tasks;
present an option for performing the training exercise;
present, based at least in part on user selection of the option, a graphical simulation for performing a first task of the plurality of tasks;
receive, during the graphical simulation, a user input corresponding to performance of the first task of the plurality of tasks; and
modify, during the graphical simulation and based at least in part on the performance of the first task, a second task of the plurality of tasks by at least selecting a new image representing the second task.

16. The user device of claim 15, wherein the triggering condition comprises at least one of starting an application at the user device, responding to a notification, detecting a period of time exceeding a threshold before a new package delivery, identifying a current location of the user device, or detecting that a future package delivery includes a physical task corresponding to any task of the plurality of tasks.

17. The user device of claim 15, wherein determining the training exercise comprises selecting the one or more images representing the plurality of tasks, the one or more images comprising graphical elements of the graphical simulation and corresponding to visual features of the plurality of tasks, the graphical simulation presented at a visual output of the user device.

18. The user device of claim 15, wherein determining the training exercise comprises assigning a first probability to the first task of the plurality of tasks and assigning a second probability to the second task.

19. The user device of claim 18, wherein modifying the second task of the plurality of tasks comprises assigning a new probability to the second task.

20. The user device of claim 15, wherein the one or more images comprise graphical elements customized based on the user profile.

* * * * *